(12) United States Patent
Ripplinger et al.

(10) Patent No.: US 12,319,856 B2
(45) Date of Patent: *Jun. 3, 2025

(54) INFRARED (IR) LUMINESCENT MATERIAL

(71) Applicant: Battle Sight Technologies, LLC, Dayton, OH (US)

(72) Inventors: Nicholas R. Ripplinger, Springboro, OH (US); Christopher J. Vogt, Cincinnati, OH (US)

(73) Assignee: Battle Sight Technologies, LLC, Dayton, OH (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/299,954

(22) Filed: Apr. 13, 2023

(65) Prior Publication Data

US 2023/0250331 A1 Aug. 10, 2023

Related U.S. Application Data

(62) Division of application No. 17/221,080, filed on Apr. 2, 2021, now Pat. No. 11,655,414.

(Continued)

(51) Int. Cl.
*C09K 11/02* (2006.01)
*C09D 11/037* (2014.01)
(Continued)

(52) U.S. Cl.
CPC ............ *C09K 11/02* (2013.01); *C09D 11/037* (2013.01); *C09D 11/106* (2013.01); *C09D 11/50* (2013.01);
(Continued)

(58) Field of Classification Search
CPC . C09K 11/02; C09K 11/7766; C09K 11/7769; C09K 11/886; C09D 11/106;
(Continued)

(56) References Cited

U.S. PATENT DOCUMENTS 6,117,362 A 9/2000 Yen et al.
6,267,911 B1 7/2001 Yen et al.
(Continued)

FOREIGN PATENT DOCUMENTS

WO 2004/077018 A2 9/2004
WO 2011/008930 A2 1/2011
(Continued)

OTHER PUBLICATIONS

Wikipedia, Polymer Degradation, 12 pages. (Year: 2023).*

*Primary Examiner* — Matthew E. Hoban
*Assistant Examiner* — Lynne Edmondson
(74) *Attorney, Agent, or Firm* — Thomas E. Lees, LLC

(57) ABSTRACT

The present disclosure teaches an article of manufacture using an industrial (or commercial) manufacturing process. The article of manufacture comprises an infrared (IR) luminescent material that emits in the IR wavelength range (e.g., from approximately seven-hundred nanometers (~700 nm) to approximately one millimeter (~1 mm)) after being excited by incident wavelengths of between ~100 nm and ~750 nm (or visible light). In other words, once the material has been exposed to visible light, the material will continue to emit in the IR wavelength range for a period of time, even when the material is no longer exposed to the visible light.

10 Claims, 2 Drawing Sheets

Related U.S. Application Data

(60) Provisional application No. 63/044,069, filed on Jun. 25, 2020.

(51) Int. Cl.
| | |
|---|---|
| *C09D 11/106* | (2014.01) |
| *C09D 11/50* | (2014.01) |
| *C09K 11/77* | (2006.01) |
| *C09K 11/88* | (2006.01) |
| *B82Y 20/00* | (2011.01) |
| *B82Y 40/00* | (2011.01) |

(52) U.S. Cl.
CPC ...... *C09K 11/7766* (2013.01); *C09K 11/7769* (2013.01); *C09K 11/886* (2013.01); *B82Y 20/00* (2013.01); *B82Y 40/00* (2013.01)

(58) Field of Classification Search
CPC ....... C09D 11/037; C09D 11/50; B82Y 20/00; B82Y 40/00; A41D 27/085; A41D 29/00
See application file for complete search history.

(56) References Cited

U.S. PATENT DOCUMENTS

| | | | |
|---|---|---|---|
| 6,953,536 | B2 | 10/2005 | Yen et al. |
| 7,976,727 | B1 | 7/2011 | Naik et al. |
| 8,329,061 | B2 | 12/2012 | Jia |
| 8,932,486 | B2 | 1/2015 | Jia |
| 9,683,169 | B2 | 6/2017 | Jia |
| 11,473,012 | B2 * | 10/2022 | Ripplinger ............ C09K 11/02 |
| 11,655,414 | B2 * | 5/2023 | Ripplinger ......... C09K 11/7766 |
| | | | 252/301.36 |
| 2004/0164277 | A1 | 8/2004 | Yen et al. |
| 2009/0095940 | A1 | 4/2009 | Meltzer et al. |
| 2011/0012059 | A1 | 1/2011 | Jia |
| 2012/0256126 | A1 | 10/2012 | Jia |
| 2014/0161849 | A1 * | 6/2014 | Bickford ................ A61Q 19/08 |
| | | | 424/59 |
| 2015/0102262 | A1 | 4/2015 | Jia |
| 2017/0275533 | A1 | 9/2017 | Jia |
| 2019/0256769 | A1 | 8/2019 | Jia et al. |

FOREIGN PATENT DOCUMENTS

| | | |
|---|---|---|
| WO | 2015/053932 A1 | 4/2015 |
| WO | 2019/165211 A1 | 8/2019 |

* cited by examiner

INFRARED (IR) LUMINESCENT MATERIAL

CROSS REFERENCE TO RELATED APPLICATIONS

This application is a divisional application of prior U.S. patent application Ser. No. 17/221,080, filed Apr. 2, 2021, having the title "Infrared (IR) Luminescent Material," which claims the benefit of U.S. Provisional Patent Application Ser. No. 63/044,069, filed Jun. 25, 2020, having the title "INFRARED (IR) LUMINESCENT MATERIAL," the disclosures of which are hereby incorporated by reference.

BACKGROUND

Field of the Disclosure

The present disclosure relates generally to luminescent material and, more particularly, infrared (IR) luminescent material.

Description of Related Art

For members of the military, it is important to be visible to friendly allies (also designated as "friendlies") while concurrently being invisible to hostile enemies (also designated as "hostiles"). Even during daylight hours, when there is clear visibility, it is sometimes difficult to visually distinguish between friendlies and hostiles. When there is low light (or even no light), this difficulty approaches practical impossibility.

SUMMARY

The present disclosure teaches an article of manufacture using an industrial manufacturing process, which comprises an infrared (IR) luminescent material that emits in the IR wavelength range (e.g., from approximately seven-hundred nanometers (~700 nm) to approximately one millimeter (~1 mm)) after being excited by incident wavelengths of between ~100 nm and ~750 nm (or visible light). Preferably, the IR luminescent material exhibits IR phosphorescence (as compared to IR fluorescence) when excited by the visible light. In other words, once the material has been exposed to the visible light, the material will continue to emit in the IR wavelength range for a period of time, even when the material is no longer exposed to the visible light.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
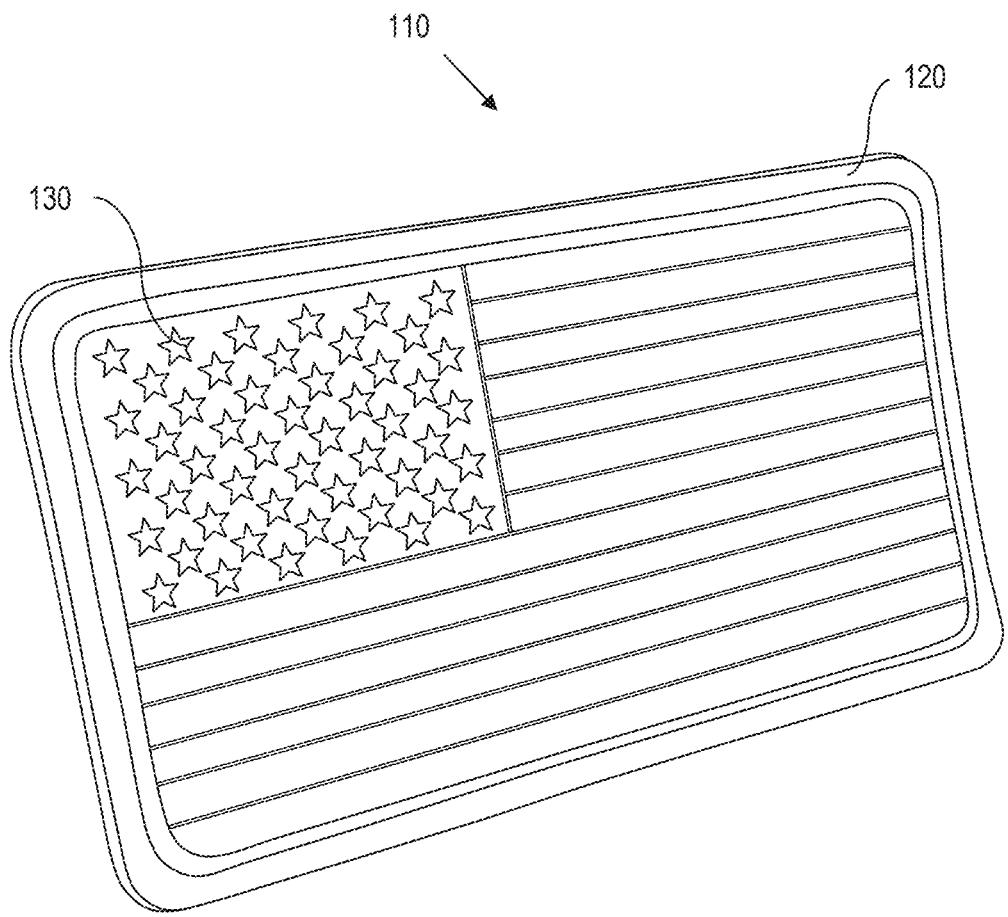
FIG. 1A is a diagram showing a perspective view of one embodiment of an article of manufacture using an industrial manufacturing process, which comprises a substrate and an infrared (IR) luminescent material operatively coupled to the substrate.

As one can imagine, during combat it is important to be visible to friendly allies (also designated as "friendlies") while concurrently being invisible to hostile enemies (also designated as "hostiles"). Even during daylight hours when there is clear visibility, it is sometimes difficult to visually distinguish between friendlies and hostiles. The distinction becomes practically impossible during low-light or no-light conditions (e.g., night).

Additionally, during nighttime operations when there is little to no visibility, personnel recovery becomes difficult and locating an isolated person in low-light or no-light conditions becomes a herculean task.

To address this problem, one embodiment of the invention includes an article of manufacture using an industrial (or commercial) manufacturing process. The article of manufacture comprises an infrared (IR) phosphorescent material that emits in the IR wavelength range when it has been exposed to visible light (which is expressly defined herein as covering a wavelength range from approximately one-hundred nanometers (~100 nm) to approximately seven-hundred-and-eighty nanometers (~780 nm)). Specifically, one example embodiment comprises an injection-molded flexible polyvinyl chloride (PVC) patch with the IR phosphorescent material. The patch is stitched or otherwise affixed to a uniform. Thus, if an individual (e.g., soldier or other military personnel) wears the patch during daylight hours, then the patch stores the energy from the sunlight and emits the stored energy in the IR wavelength range. These IR emissions make the individual virtually invisible to the naked eye when it becomes dark, but visible to those having IR detectors (such as night vision goggles). As one can appreciate, the PVC material can also be formed into PVC strips that can be sewn into other materials (e.g., clothing, etc.). By way of example, one embodiment of the IR phosphorescent material comprises a ceramic-based IR luminescent powder that can be incorporated into any number of commercial products or commercial processes.

Also, unlike currently available active markers, such as signal beacons that require a battery or other power source, the disclosed IR luminescent materials are passive and therefore provide continuous, perpetually rechargeable, customizable, and lightweight solutions for finding isolated persons, combat search and rescue operations, or personnel recovery in low-to-no light conditions.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Example Embodiment 1: A Patch with Infrared (IR) Luminescent Material

Figure 1B:
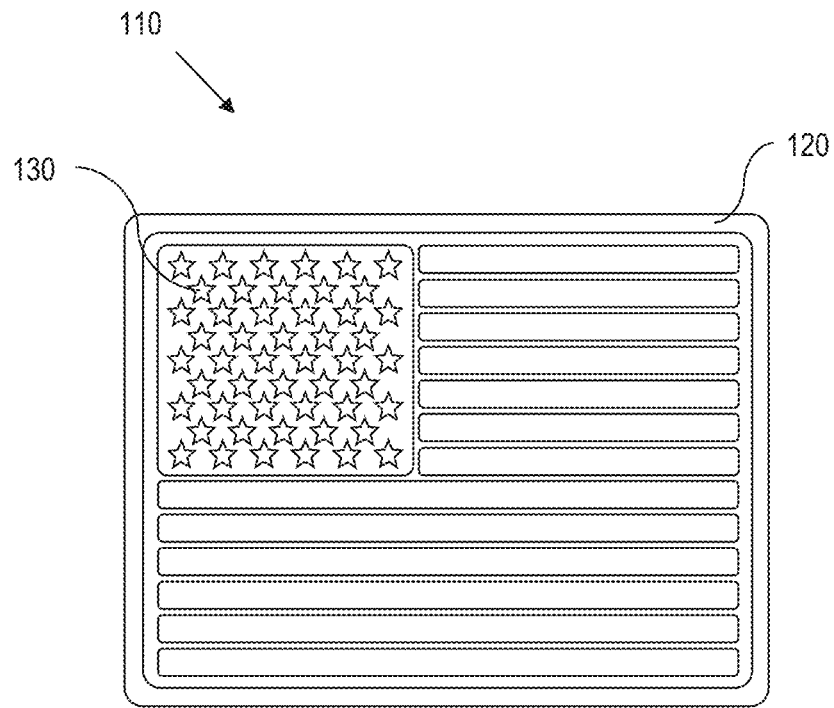
FIG. 1B is a diagram showing a front view of the article of manufacture of FIG. 1A
Figure 1C:
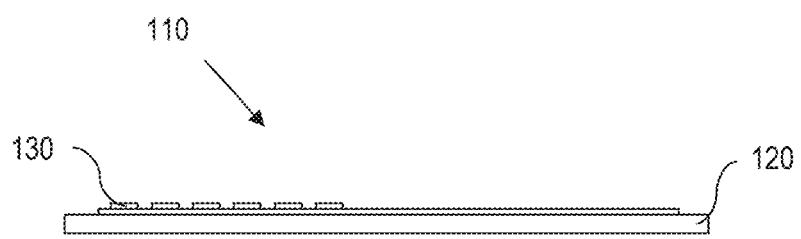
FIG. 1C is a diagram showing a side view of the article of manufacture of FIG. 1A

By way of example, FIGS. 1A, 1B, and 1C (collectively designated as "FIG. 1") show one embodiment of an article of manufacture 110 that is made using an industrial (or commercial) manufacturing process. The article of manufacture 110 comprises a substrate 120 and an infrared (IR) luminescent material 130 operatively coupled to the substrate 120. Specifically, the embodiment of FIG. 1 shows a patch 110 that can be stitched or otherwise affixed to a uniform. In the embodiment of FIG. 1, the patch 110 is a flexible polyvinyl chloride (PVC) patch 110 that is manufactured using known multi-component injection-molding processes (also known as multi-shot injection molding processes), which inject different materials or resins into one or more plastic parts to achieve multiple, different, or specific functions (e.g., a hard component combined with a soft component, a core component combined with a skin, a component of one color combined with a component of a different color, etc.).

For the embodiment of FIG. 1, the injection-molded flexible PVC patch 110 comprises a non-IR luminescent substrate 120 that provides a background, while the IR luminescent material 130 forms a pattern (here, an elevated or raised-relief pattern of the flag of the United States of America on the substrate 120). Thus, when viewed using an IR detector, the patch 110 illuminates the United States flag pattern because of the IR luminescent material 130.

When the patch 110 is sewn or stitched to a uniform, the patch 110 identifies, to a certain extent, a soldier or other individual donning that uniform. As such, when the individual wears the patch 110 during daylight hours, the patch 110 stores energy from sunlight and emits the stored energy in an IR wavelength range. Because IR wavelengths are virtually invisible to the naked (or unaided) eye, the individual becomes effectively invisible to the naked eye when darkness falls. However, that same individual becomes visible to those having an IR detector due to the IR luminescent material 130 on the patch 110.

For other embodiments, rather than being injection molded, the patch 110 comprises fabric that is impregnated with the IR luminescent material. Indeed, in alternative embodiments, selected portions (if not all) of the uniform are impregnated with the IR luminescent material, thereby becoming part of a wearable fabric. For yet other embodiments, rather than sewing the patch 110 onto the uniform, hook-and-loop fasteners or other attachment means (e.g., heat-fusible glues, epoxies, gels, resins, etc.) are used to affix or bond the patch 110 to the uniform (e.g., using an iron).

Example Embodiment 2: Chemical Composition of IR Luminescent Material

Before discussing other embodiments of the article of manufacture 110, it is useful to discuss various embodiments of the IR luminescent material 130. For example, in one embodiment, the IR luminescent material 130 comprises a Chromium-doped Zinc-Nitro-Antimony-Gallium-Tellurium IR phosphorescent compound, such as any of the individual compounds disclosed and taught in U.S. Pat. No. 7,976,727, by Naik et al., issued on 2011 Jul. 12 (hereafter, the "Naik Patent" or "the '727 Patent"). The Naik Patent is incorporated herein by reference as if expressly set forth in its entirety.

Consequently, one embodiment of the IR luminescent material 130 comprises $Zn_{0.96}SbGaTe_{0.1}O_{4.15}N_{0.05}$: 3% $Cr^{3+}$, 1% $Nd^{3+}$, wherein Zn represents Zinc, Sb represents Antimony, Ga represents Gallium, Te represents Tellurium, O represents Oxygen, N represents Nitrogen, Cr represents Chromium, and Nd represents Neodymium (with the numbers representing mol percent). In another embodiment, the IR luminescent material 130 comprises $Zn_{0.96}SbGaTeO_{5.95}N_{0.05}$: 3% $Cr^{3+}$, 1% $Nd^{3+}$. In yet another embodiment, the IR luminescent material 130 comprises certain combinations of Gadolinium (Gd), Scandium (Sc) or Antimony (Sb), Nickel (Ni), and Zirconium (Zr), and doped with $Ni^{2+}$, $Zr^{4+}$, $Cr^{3+}$, $Nd^{3+}$, with Ni representing Nickel. In further embodiments, the IR luminescent material 130 comprises certain combinations of $La_3In_2Ga_3O_{12}$: $Cr^{3+}$, $Dy^{3+}$, Lanthanum (La), Indium (In), Ga, O, and doped with $Cr^{3+}$ and/or $Dy^{3+}$, with Dy representing Dysprosium.

Broadly, other embodiments of the IR luminescent material 130 comprise a suitable combination of Zn, Sb, Ga, Te, O, N, Cr, and Nd, which (when combined) absorbs light in the wavelength range from ~100 nm to ~750 nm and emits in the IR wavelength range. For yet other embodiments, the IR luminescent material 130 comprises any suitable combination or permutation of any of the following, as long as the permutation or combination results in IR phosphorescence after visible light exposure: Zn, Sb, Ga, Te, O, N, Cr (such as, for example, a trivalent Chromium ion ($Cr^{3+}$)), Thulium (Tm), Lithium (Li), Potassium (K), Magnesium (Mg), Manganese (Mn), Dy, Aluminum (Al), Yttrium (Y), Nd, Fluorine (F), Titanium (Ti), Silicon (Si), Vanadium (V), In, La, Sc, Gd, Ni, Zr, or Phosphorous (P).

By way of example, several possible combinations include the following and variants of the following:

$LaAl_{11}O_{18}$: $Mn_{0.425}$, $Si_{0.425}$ (emitting at a center wavelength ($\lambda$) of ~700 nm);

$GdLiF_4$:2% Nd (emitting at a center $\lambda$ of ~900 nm);

$Gd_xYLi_{1-x}F_4$:2% Nd, with x representing mol fraction (emitting at a center $\lambda$ of ~900 nm);

$Li(Y_{1-x}Gd_x)F_4$:1% Nd, with x representing mol fraction (emitting at a center $\lambda$ of ~900 nm);

$GdLiF_4$:1% Tm (emitting at a center) of ~800 nm);

$Zn_3Ga_2Ge_4O_{14}$:$0.02Cr^{3+}$ (emitting at a center) at ~710 nm);

$Zn_3Ga_2Ge_4O_{14}$:$0.02Cr^{3+}$, $0.1Sb^{3+}$ (emitting at a center $\lambda$ at ~710 nm);

$Zn_3Ga_2Si_4O_{14}$:$0.02Cr^{3+}$ (emitting at a center $\lambda$ at ~710 nm);

$Zn_3Ga_2Si_4O_{14}$:$0.02Cr^{3+}$, $0.2Sb^{3+}$ (emitting at a center $\lambda$ at ~710 nm);

$Zn_3Ga_2Si_4O_{14}$:$0.02Cr^{3+}$, $0.1Sb^{3+}$ (emitting at a center) at ~750 nm);

$Ca_3Ga_2Ti_4O_{14}$:$0.02Cr^{3+}$, $0.2Sb^{3+}$ (emitting at a center) at ~760 nm);

$Zn_3Ga_{1.38}Al_{0.4}Si_4O_{14}$:$0.02Cr^{3+}$, $0.2Sb^{3+}$ (emitting at a center) at ~760 nm);

$La_3Ga_2SiO_{14}$:$0.02Cr^{3+}$, $0.2Sb^{3+}$ (emitting at a center $\lambda$ at ~760 nm);

$Ca_3Ga_2Si_3O_{14}$:$0.02Cr^{3+}$, $0.2Sb^{3+}$ (emitting at a center $\lambda$ at ~760 nm);

$Zn_3Ga_2Si_4O_{14}$:$0.02Cr^{3+}$, $0.2Sb^{3+}$ (emitting at a center $\lambda$ at ~1350 nm);

$Zn_3Ga_2Si_4O_{14}$:$0.02Cr^{3+}$, $0.02Ni^{2+}$, $0.2Sb^{3+}$ (emitting at a center) at ~1450 nm); or $Gd_3In_2Ga_3O_{12}$:$0.02Cr^{3+}$, $0.01Nd^{2+}$, $0.2Sb^{3+}$ (multiple $\lambda$ at ~782 nm, ~927 nm, and ~1050 nm).

As one can see from these examples, the center wavelengths ($\lambda$) for the phosphorescent emissions can be controlled and selected through various permutations and combinations of elements, as understood by those having skill in the art, thereby allowing for custom-tailored emissions in different parts of the IR wavelength range.

It should also be appreciated that, the disclosed embodiments contemplate both IR fluorescent materials (e.g., materials that emit in the IR wavelength range when illuminated with visible light) and IR phosphorescent materials (e.g., materials that emit in the IR wavelength range even when visible light no longer illuminates the material). However, because the preferred environment is low-light-to-no-light military environments, an IR phosphorescent material (which does not require continual exposure to visible light) is preferred over an IR fluorescent material (which emits IR substantially concurrently with exposure to visible light).

Example Embodiment 3: IR Luminescent Particles with Specified Material Properties It should also be appreciated that, for some embodiments, the IR-luminescent materials include IR-luminescent particles (such as powders) that are manufactured to a desired maximum particle size, $S_{max}$ (e.g., a maximum diameter of between approximately ten micrometers (~10 μm) to ~600 μm) using a comminution process (e.g., crushing, grinding (e.g., coarse grinding, fine grinding, etc.), milling (e.g., ball milling, etc.), or other known comminution processes). These IR-luminescent particles or powders can be incorporated into various materials to permit manufacturing of IR-luminescent PVC patches (as described above), IR-luminescent paints (as described below), IR-luminescent filaments (also described below), IR-luminescent film (also described below), IR-luminescent threads, IR-luminescent fabric, etc.

Although a maximum particle size of ~600 μm in diameter ($S_{max}$<~600 μm) is provided as an example embodiment, it should be appreciated that, for other embodiments that require finer particles, $S_{max}$<~450 μm, $S_{max}$<~300 μm, or even $S_{max}$<~200 μm. For applications that require the particles to be in powder form (e.g., suspensions, paints, etc.), the maximum particle size can be as small as $S_{max}$<~100 μm, $S_{max}$<~50 μm, or $S_{max}$<~15 μm.

In addition to ball-milling, those having skill in the art will appreciate that other comminution processes can be used, such as, for example, crushing, or grinding (either coarse or fine). Also, those having skill in the art will understand that additional processes can be employed to obtain a suitable powder, such as purification processes (such as washing, acid leaching, magnetic separation, froth flotation, etc.), sizing processes (e.g., using vibration screens), classification processes (e.g., using air classifiers, liquid classifiers, etc.), calcining processes, liquid dispersion processes, and/or granulation processes (e.g., direct missing, spray drying, etc.).

In some embodiments, one important material property is the IR-luminescent lifetime of the IR-luminescent particles or powder. For purposes of this disclosure, the IR-luminescent lifetime is defined as the amount of time that the IR-luminescent particles is detectable using night-vision goggles (NVGs) before the IR signal is too weak to detect reliably. Another relevant material property is charging time for the IR-luminescent particles, which is defined herein as approximate exposure time that is required to store sufficient energy in the IR-luminescent particles to induce IR luminescence for a desired IR-luminescent lifetime. Preferably, one embodiment comprises an IR-luminescent lifetime ($t_{life}$) of between approximately eight hours to forty-eight hours (i.e., ~8 hrs<$t_{life}$<~48 hrs) when the IR-luminescent particles have been exposed to between approximately fifteen minutes to sixty minutes of charging time (i.e., ~15 min<$t_{charge}$<~60 min), either in sunlight or other equivalent light that charges the IR-luminescent particles. Depending on various factors (e.g., particle size, charging time, chemical composition, etc.), it is possible to obtain $t_{life}$>~12 hrs, $t_{life}$>~24 hrs, or even $t_{life}$>~48 hrs.

Another material property is the operating temperature range, which is defined herein as the temperature range in which the material resists degradation. For some embodiments of the IR-luminescent particles, the material properties comprise an operating temperature range ($T_{operating}$) of between approximately negative twenty-five degrees Fahrenheit (−25° F.) to approximately one-hundred-and-twenty degrees Fahrenheit (120° F.). More preferably, the $T_{operating}$ is between approximately −40° F. to approximately 165° F.

Example Embodiment 4: Paint Comprising IR Luminescent Material

Having discussed several different ways of achieving IR phosphorescence, this disclosure teaches another example embodiment of an article of manufacture, namely, a paint. Extending the principles that are applicable to the patch 110 (FIG. 1), another embodiment of the invention is a paint comprising the IR luminescent material.

Paints have four (4) basic components (pigments, binders, liquids (e.g., solvents, diluents, etc.), and additives (e.g., hardeners, thickeners, defoamers, biocides, additional solvents, etc.)). Consequently, in one embodiment, the binder of the paint acts as the substrate, while the IR luminescent materials are incorporated into the paint as the pigment, the liquid, or the additive (or any combination or permutation of pigment, liquid, and additive). For some embodiments of the paint, the IR luminescent material is the liquid itself, while in other embodiments the IR luminescent material is a solute in the solvent, and in yet other embodiments the IR luminescent material is a powder or a suspension (either homogeneous or heterogeneous) in the liquid.

It should be appreciated that if the paint is a sprayable paint, then the IR luminescent material has a particle size that is small enough for use with a spray paint nozzle. For example, in some embodiments the particle size for the IR luminescent materials are between approximately one-and-a-half nanometers (~1.5 nm) to ~100 nm, while for other embodiments the particle sizes can be up to ~10 μm. If the IR luminescent material comprises a ceramic-based IR luminescent powder, then the powder can be milled to an appropriate size through ball milling or other suitable grinding processes that are known to those having skill in the art. For example, the particle size for some embodiments of ball-milled particles is between ~10 μm and ~600 μm.

In this way, the IR luminescent materials are applied to any paintable surface, thereby becoming a coating for the surface and making the surface visible to IR detectors in low- or no-light conditions. Consequently, a paintable article of manufacture can be any type of vehicle (such as an inflatable raft or other military vehicle), which serves as the substrate upon which the IR luminescent material is painted or coated.

Example Embodiment 5: IR Luminescent Filament for Three-Dimensional (3D) Printing In yet another embodiment the article of manufacture is a filament for three-dimensional (3D) printing. Insofar as the filament is typically a strand of plastic (e.g., glycol-modified polyethylene terephthalate (PETG), nylon, polylactic acid (PLA), polycarbonate (PC), etc.) that is extruded by a 3D printer, the IR luminescent material is integrated into the plastic filament during the manufacture of the filament. As a result, when the filament is exposed to visible light, the filament becomes IR phosphorescent.

Extending this further, the article of manufacture for other embodiments is a 3D printed object in which each deposited layer becomes the substrate on which each subsequent layer of IR phosphorescent layer is deposited or fused.

Example Embodiment 6: Film Comprising IR Luminescent Material

In yet another embodiment, the article of manufacture comprises a substrate on which an IR luminescent film (more specifically, a thin film (or ultrathin film)) is chemically or physically deposited. To the extent that the thin film alters surface properties of the substrate, the incorporation of IR luminescent components into the thin film permits concurrent modification of surface properties and IR luminescence. Viewed on a component level, the thin film itself is a substrate to which the IR luminescent material is operatively coupled.

In other embodiments, the article of manufacture is a low-density polyethylene (PE) film with the IR luminescent material infusing the film. As a film, this embodiment is commercially manufacturable and usable in a tape, sticker, or other adhesive-backed product that sticks to many different types of surfaces. For some embodiments, a ceramic-based IR luminescent powder along with plastic is formed into IR luminescent microbeads, which are deposited onto a film to manufacture an IR luminescent film. The IR luminescent film is manufactured as a roll, which can be cut into suitable sizes and sewn (or otherwise affixed) to another material (e.g., uniform or other fabric, etc.). As those having skill in the art will appreciate, the IR luminescent film can range in thickness from approximately one mil (~1 mil, which is ~0.0254 mm) to approximately twenty mil (~20 mil, which is ~0.508 mm).

Example Embodiment 7: Definition of IR Wavelength Range for Different Embodiments Having described various embodiments of different articles of manufacture having the IR luminescent material, it should be appreciated that the precise IR wavelength ranges vary as a function of their uses in science or industry. As such, the phrase IR wavelength range, as used herein, is expressly defined as a range from ~700 nm (on the low end) to approximately one millimeter (~1 mm, on the high end), and furthermore is defined to encompass all of the sub-ranges within their respective uses in science and industry.

For example, the IR wavelength range comprises a wavelength range from ~700 nm to ~1 mm with reference to the electromagnetic (EM) spectrum. However, in other contexts, such as for commonly used sub-division schemes, a range of approximately fifteen micrometers (~15 μm) to ~1 mm encompasses far IR (FIR), while ~8 μm to ~15 μm encompasses long-wave IR (LWIR or IR-C DIN), ~3 μm to ~8 μm for mid-wavelength IR (MWIR, MidIR, Intermediate Infrared (IIR), or IR-C DIN), ~1.4 μm to ~3 μm for short-wave IR (SWIR or IR-B DIN), and ~750 nm to ~1.4 μm for near IR (NIR or IR-A DIN). In yet other contexts, such as the wavelength division scheme of the International Commission on Illumination (CIE), the IR wavelength ranges are divided as: ~700 nm to ~1400 nm for IR-A; ~1400 nm to ~3000 nm for IR-B; and ~3000 nm to ~1 mm for IR-C. For the ISO 20473 scheme, the wavelength ranges are defined differently for NIR (~780 nm to ~3 μm); MIR (~3 μm to ~50 μm); and FIR (~50 μm to ~1 mm). In yet another context, such as the division scheme used in astronomy, the IR wavelength ranges are divided as: ~700 nm to ~5 μm for NIR; ~5 μm to ~40 μm for MIR; and ~25 μm to ~350 μm for FIR.

Advantages

As described above, for some embodiments, the IR luminescent materials are ceramic-based IR luminescent industrial powders that can be incorporated into many different devices or processes. Because IR luminescent powders provide a passive source of IR emissions, the powders allow for continuous, perpetually rechargeable, customizable, and lightweight solutions that do not require a heavy power source (e.g., battery or power cell).

Furthermore, because the powders can be crushed or pulverized into microscopic or sub-microscopic particle sizes, they can be readily incorporated into many different usable forms (e.g., films, tapes, epoxies, bands, patches, etc.). It should be noted that the particle size affects visibility and, therefore, the particle size is not merely a design choice but, rather, a functional consideration. Although the decay rate itself (meaning, how quickly the light fades) is theoretically independent of the particle size, the number or concentration of luminescent molecules does depend on particle size. Because the concentration or number of luminescent molecules affects brightness, the particle size correspondingly affects visibility. For this reason, there is a practical trade-off between particle size, visibility, and industrial manufacturability. For example, larger particles are preferable for better visibility because higher numbers or concentrations of luminescent molecules provide higher light intensity. On the other hand, smaller particles are preferable for incorporating into dyes, paints, powders, liquids, or other readily applicable luminescent material because larger particles tend to cause blockage and impede commercial or industrial processes. Consequently, it is entirely possible to render inoperable certain industrial processes by selecting a particle size that is either too large or too small.

Slight alterations in the chemical composition provide an ability to custom tailor both the emission wavelength of the IR luminescent materials and the duration of phosphorescence (or decay rate). For example, some formulations of the IR luminescent materials exhibit phosphorescence for up to twenty (20) hours (e.g., approximately four (~4) hours, approximately eight (~8) hours, etc.). In some embodiments, long-duration phosphorescence is achievable after approximately fifteen (~15) minutes of exposure to visible light. In other words, judicious selection of the chemical components permits synthesis of IR luminescent materials that have long persistence times with short recharging times.

Other formulations permit customizable emission wavelength peaks of, for example, ~760 nm (which straddles the border between visible spectrum and the IR spectrum). Other formulations, such as those having Gd, Ga, O, and Sc (or Sb), and co-doped with $Ni^{2+}$, $Zr^{4+}$, $Cr^{3+}$, $Nd^{3+}$, have exhibited a peak IR emission wavelength that is centered at ~1550 nm. Yet other formulations with La, In, Ga, and O, and co-doped with $Cr^{3+}$ and $Dy^{3+}$, have exhibited a peak IR emission wavelength that is centered at ~900 nm. At bottom, the various embodiments disclosed herein demonstrate the wavelength flexibility of the IR luminescent material, which permits custom tailoring of emissions wavelengths so that instruments can be tuned with particularity to filter and detect the IR luminescent materials, whether in the NIR, SWIR, or FIR wavelength ranges.

The long persistence and customizable wavelengths result in the IR luminescent materials being detectable from great distances, sometimes beyond one kilometer (1 km), which permits aerial detection, drone-based detection, or (in some cases) even satellite-based detection.

Additionally, because the IR luminescent materials can be incorporated into different emulsifications or substrates, the resulting articles of manufacture can range from quickly degrading products or durable products that can withstand harsh environmental conditions. For example, some embodiments can resist degradation in temperatures ranging from approximately negative twenty-five degrees Fahrenheit (−25° F.) to approximately one-hundred-and-twenty degrees Fahrenheit (120° F.). For other embodiments, the article of manufacture resists degradation in a wider temperature range of between approximately −40° F. to approximately 165° F.

Military and Civilian Uses

As noted above, some of the military uses of the IR luminescent materials include isolated personnel identification, personnel recovery, and combat search and rescue operations. Additionally, because the IR luminescent materials can be configured for application on almost any surface (e.g., clothing, vehicles, weapons, etc.), the IR luminescent materials when used as a paint can be used for tagging hostile targets. For some embodiments, the IR luminescent materials can be used as an ink to mark maps, thereby allowing for map reading in the dark (with the assistance of, for example, night-vision googles or other IR detectors).

Because of their properties, the IR luminescent materials are also suitable for a host of civilian uses. For example, as one having ordinary skill in the art will appreciate, there are widespread applications for law enforcement, border security, emergency management, coast guard search and rescue, fish and wildlife enforcement, and a host of other fields in which personnel operate in low-light or no-light conditions.

Moreover, when incorporated into ropes, the IR luminescent materials find additional applicability in commercial, recreational, or industrial uses. Also, when incorporated into utility bags or storage pouches, the IR luminescent materials can serve as lightweight, rechargeable location markers for campers, hikers, or other adventurers that spend extended periods of time outdoors. Additionally, when incorporated into dog vests or collars, the IR luminescent materials permit nighttime operations that employ canine units or other service animals.

Having described various embodiments of articles of manufacture, substrates, and IR luminescent materials, it should be understood that any process descriptions or blocks in flow charts are executable out of order from that shown or discussed, including substantially concurrently or in reverse order, depending on the functionality involved, as would be understood by those reasonably skilled in the art of the present disclosure. Additionally, although exemplary embodiments have been shown and described, it will be clear to those of ordinary skill in the art that a number of changes, modifications, or alterations to the disclosure as described may be made. For example, although injection-molded materials and PVC materials are discussed in the detailed description as several embodiments of the substrate, it should be appreciated that (depending on the particular use or context as will be understood by those having skill in the art) for different embodiments the substrate comprises: a polymer; a fabric; a metal; silicone; rubber; latex; epoxy; thread; plastic; wood; a composite; nanoparticles; cardboard; paper; a film (e.g., thin film or ultrathin film); various manufactured materials; or any permutation or combination of these example embodiments of substrates. All such changes, modifications, and alterations should therefore be seen as within the scope of the disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. An article of manufacture comprising:
   a filament for three-dimensional (3D) printing; and
   infrared (IR) phosphorescent particles that phosphoresce for more than four (4) hours upon being exposed to approximately fifteen (~15) minutes of visible light, the IR phosphorescent particles being homogeneously distributed in the filament, the IR phosphorescent particles having a particle size that ranges from approximately one-and-a-half nanometers (~1.5 nm) to approximately six hundred micrometers (~600 µm), the IR phosphorescent particles resisting degradation in temperatures ranging from approximately −40° F. to approximately 165° F.;
   wherein the IR phosphorescent particles comprise a combination of Zinc (Zn), Antimony (Sb), Gallium (Ga), Tellurium (Te), Oxygen (O), Nitrogen (N), Chromium (Cr), and Neodymium (Nd).

2. The article of manufacture of claim 1, the IR phosphorescent particles comprising an emission wavelength ($\lambda$) range, the $\lambda$ range being one selected from the group consisting of:
   between approximately 700 nanometers (~700 nm) and approximately one millimeter (~1 mm);
   between approximately fifteen micrometers (~15 µm) and ~1 mm;
   between ~8 µm and ~15 µm;
   between ~3 µm and ~8 µm;
   between ~1.4 µm and ~3 µm;
   between ~750 nm and ~1.4 µm;
   between ~700 nm and ~1400 nm;
   between ~1400 nm and ~3000 nm;
   between ~3 µm and ~1 mm;
   between ~780 nm and ~3 µm;
   between ~3 µm and ~50 µm;
   between ~50 µm and ~1 mm;
   between ~700 nm and ~5 µm;
   between ~5 µm and ~40 µm;

between ~25 μm and ~350 μm; and
a 2 range having a center wavelength of ~920 nm.

3. The article of manufacture of claim 1, the IR phosphorescent particles resisting degradation in temperatures ranging from approximately negative twenty-five degrees Fahrenheit (−25° F.) to approximately one-hundred-and-twenty degrees Fahrenheit (120° F.).

4. The article of manufacture of claim 1, the IR phosphorescent particles being configured to phosphoresce for up to approximately twenty (20) hours upon being exposed to ~15 minutes of visible light.

5. The article of manufacture of claim 1, the IR phosphorescent particles comprising an emission wavelength (λ) range of between approximately 700 nanometers (~700 nm) and approximately one millimeter (~1 mm).

6. An article of manufacture comprising:
a filament for three-dimensional (3D) printing; and
infrared (IR) phosphorescent particles that phosphoresce for more than four (4) hours upon being exposed to approximately fifteen (~15) minutes of visible light, the IR phosphorescent particles being homogeneously distributed in the filament, the IR phosphorescent particles having a particle size that ranges from approximately one-and-a-half nanometers (~1.5 nm) to approximately six hundred micrometers (~600 μm), the IR phosphorescent particles resisting degradation in temperatures ranging from approximately −40° F. to approximately 165° F.;
wherein the IR phosphorescent particles have a chemical composition selected from the group consisting of:
  $Zn_{0.96}SbGaTe_{0.1}O_{4.15}N_{0.05}$:3% $Cr^{3+}$, 1% $Nd^{3+}$, wherein Zn represents Zinc, Sb represents Antimony, Ga represents Gallium, Te represents Tellurium, O represents Oxygen, N represents Nitrogen, Cr represents Chromium, and Nd represents Neodymium;
  $LaAl_{11}O_{18}$: $Mn_{0.425}$, $Si_{0.425}$, wherein La represents Lanthanum, Al represents Aluminum, Mn represents Manganese, and Si represents Silicon;
  $GdLiF_4$:2% Nd, wherein Gd represents Gadolinium, Li represents Lithium, and F represents Fluorine;
  $Gd_xYLi_{1-x}F_4$:2% Nd, wherein x represents mol fraction and Y represents Yttrium;
  $Li(Y_{1-x}Gd_x)F_4$:1% Nd;
  $GdLiF_4$:1% Tm, wherein Tm represents Thulium;
  $Zn_3Ga_2Ge_4O_{14}$:$0.02Cr^{3+}$, wherein Ge represents Germanium;
  $Zn_3Ga_2Ge_4O_{14}$:$0.02Cr^{3+}$, $0.1Sb^{3+}$;
  $Zn_3Ga_2Si_4O_{14}$:$0.02Cr^{3+}$;
  $Zn_3Ga_2Si_4O_{14}$:$0.02Cr^{3+}$, $0.2Sb^{3+}$;
  $Zn_3Ga_2Si_4O_{14}$:$0.02Cr^{3+}$, $0.1Sb^{3+}$;
  $Ca_3Ga_2Ti_4O_{14}$:$0.02Cr^{3+}$, $0.2Sb^{3+}$, wherein Ca represents Calcium and Ti represents Titanium;
  $Zn_3Ga_{1.38}Al_{0.4}Si_4O_{14}$:$0.02Cr^{3+}$, $0.2Sb^{3+}$;
  $La_3Ga_2SiO_{14}$:$0.02Cr^{3+}$, $0.2Sb^{3+}$;
  $Ca_3Ga_2Si_3O_{14}$:$0.02Cr^{3+}$, $0.2Sb^{3+}$;
  $Zn_3Ga_2Si_4O_{14}$:$0.02Ni^{2+}$, $0.2Sb^{3+}$;
  $Zn_3Ga_2Si_4O_{14}$:$0.02Cr^{3+}$, $0.02Ni^{2+}$, $0.2Sb^{3+}$; and
  $Gd_3In_2Ga_3O_{12}$: $0.02Cr^{3+}$, $0.01Nd^{2+}$, $0.2Sb^{3+}$.

7. An article of manufacture comprising:
a filament for three-dimensional (3D) printing; and
infrared (IR) phosphorescent particles that phosphoresce for more than four (4) hours upon being exposed to approximately fifteen (~15) minutes of visible light, the IR phosphorescent particles being homogeneously distributed in the filament, the IR phosphorescent particles having a particle size that ranges from approximately one-and-a-half nanometers (~1.5 nm) to approximately six hundred micrometers (~600 μm), the IR phosphorescent particles resisting degradation in temperatures ranging from approximately −40° F. to approximately 165° F., the IR phosphorescent particles comprising a dopant selected from the group consisting of:
$Ni^{2+}$, wherein Ni represents Nickel;
$Zr^{4+}$, wherein Zr represents Zirconium;
$Cr^{3+}$, wherein Cr represents Chromium; and
$Nd^{3+}$, wherein Nd represents Neodymium;
wherein the IR phosphorescent particles have a chemical composition selected from the group consisting of:
  $Zn_{0.96}SbGaTe_{0.1}O_{4.15}N_{0.05}$:3% $Cr^{3+}$, 1% $Nd^{3+}$, wherein Zn represents Zinc, Sb represents Antimony, Ga represents Gallium, Te represents Tellurium, O represents Oxygen, and N represents Nitrogen;
  $GdLiF_4$:2% Nd, wherein Gd represents Gadolinium, Li represents Lithium, and F represents Fluorine;
  $Gd_xYLi_{1-x}F_4$:2% Nd, wherein x represents mol fraction and Y represents Yttrium;
  $Li(Y_{1-x}Gd_x)F_4$:1% Nd;
  $Zn_3Ga_2Ge_4O_{14}$:$0.02Cr^{3+}$, wherein Ge represents Germanium;
  $Zn_3Ga_2Ge_4O_{14}$:$0.02Cr^{3+}$, $0.1Sb^{3+}$;
  $Zn_3Ga_2Si_4O_{14}$:$0.02Cr^{3+}$;
  $Zn_3Ga_2Si_4O_{14}$:$0.02Cr^{3+}$, $0.2Sb^{3+}$;
  $Zn_3Ga_2Si_4O_{14}$:$0.02Cr^{3+}$, $0.1Sb^{3+}$;
  $Ca_3Ga_2Ti_4O_{14}$:$0.02Cr^{3+}$, $0.2Sb^{3+}$, wherein Ca represents Calcium and Ti represents Titanium;
  $Zn_3Ga_{1.38}Al_{0.4}Si_4O_{14}$:$0.02Cr^{3+}$, $0.2Sb^{3+}$;
  $La_3Ga_2SiO_{14}$:$0.02Cr^{3+}$, $0.2Sb^{3+}$;
  $Ca_3Ga_2Si_3O_{14}$:$0.02Cr^{3+}$, $0.2Sb^{3+}$;
  $Zn_3Ga_2Si_4O_{14}$:$0.02Ni^{2+}$, $0.2Sb^{3+}$;
  $Zn_3Ga_2Si_4O_{14}$:$0.02Cr^{3+}$, $0.02Ni^{2+}$, $0.2Sb^{3+}$; and
  $Gd_3In_2Ga_3O_{12}$: $0.02Cr^{3+}$, $0.01Nd^{2+}$, $0.2Sb^{3+}$.

8. The article of manufacture of claim 7, the IR phosphorescent particles comprising an emission wavelength (λ) range of between approximately 700 nanometers (~700 nm) and approximately one millimeter (~1 mm).

9. The article of manufacture of claim 7, the IR phosphorescent particles resisting degradation in temperatures ranging from approximately negative twenty-five degrees Fahrenheit (−25° F.) to approximately one-hundred-and-twenty degrees Fahrenheit (120° F.).

10. The article of manufacture of claim 7, the IR phosphorescent particles being configured to phosphoresce for up to approximately twenty (20) hours upon being exposed to ~15 minutes of visible light.

* * * * *